United States Patent
Barhate et al.

(10) Patent No.: US 10,275,312 B1
(45) Date of Patent: Apr. 30, 2019

(54) SYSTEMS AND METHODS FOR SELECTING A SET OF STORAGE NODES FOR USE IN RECONSTRUCTING DATA ON A FAULTED NODE IN AN ERASURE-CODED SYSTEM

(71) Applicant: Veritas Technologies LLC, Moutain View, CA (US)

(72) Inventors: Deodatta Barhate, Pune (IN); Roshan Kolhe, Wardha (IN); Pritam Bankar, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 225 days.

(21) Appl. No.: 15/472,393

(22) Filed: Mar. 29, 2017

(51) Int. Cl.
  *G06F 11/10* (2006.01)
  *G06F 11/16* (2006.01)
(52) U.S. Cl.
  CPC ...... *G06F 11/1088* (2013.01); *G06F 11/1612* (2013.01)
(58) Field of Classification Search
  CPC .......................... G06F 11/1088; G06F 11/1092
  USPC ......................................................... 714/6.24
  See application file for complete search history.

(56) References Cited

U.S. PATENT DOCUMENTS

| | | | | |
|---|---|---|---|---|
| 9,176,812 B1* | 11/2015 | Northcott | ............ | G06F 11/1068 |
| 9,923,970 B2* | 3/2018 | Bestler | ................ | G06F 11/1076 |
| 2014/0172930 A1* | 6/2014 | Molaro | ............ | G06F 17/30215 |
| | | | | 707/827 |
| 2014/0173235 A1* | 6/2014 | Molaro | ................ | G06F 3/0619 |
| | | | | 711/162 |
| 2016/0057226 A1* | 2/2016 | Bestler | ................ | G06F 11/1076 |
| | | | | 709/217 |
| 2018/0173438 A1* | 6/2018 | Li | .......................... | G06F 3/0619 |

OTHER PUBLICATIONS

Cheng Huang, Huseyin Simitci et al., USENIX ATC 2012, "Erasure Coding in Windows azure storage".
Samuel Just, Linux Foundation, CEPH "Erasure Coding and Cache Tiering", 2015.

* cited by examiner

*Primary Examiner* — Chae M Ko
(74) *Attorney, Agent, or Firm* — FisherBroyles, LLP

(57) ABSTRACT

The disclosed computer-implemented method for selecting a set of storage nodes from a plurality of storage nodes for use in reconstructing data on a faulted node in an erasure-coded system may include determining an average read access latency for a first set of storage nodes, detecting a storage failure a storage node, selecting a subset of the first set of storage nodes, such that the average read access latency for each of the storage nodes within the subset has a lower average read access latency than at least one other node (or as many as all the other nodes) of the available storage nodes, and reconstructing data that was stored on the failed storage node from the subset of the first set of storage nodes. During reconstruction, each of the nodes multiplies their data chunk by a coefficient and transmits the resulting product to an initiator node.

20 Claims, 5 Drawing Sheets

SYSTEMS AND METHODS FOR SELECTING A SET OF STORAGE NODES FOR USE IN RECONSTRUCTING DATA ON A FAULTED NODE IN AN ERASURE-CODED SYSTEM

BACKGROUND

Erasure coding, often referred to as Reed-Solomon coding, is an object-level, parity-based scheme for preventing data loss resulting from storage system failure. In erasure coding, data is partitioned into k data chunks, which are encoded into m parity chunks and both data and parity chunks are stored across distributed storage subsystems called failure domains.

Despite the advantages of erasure encoding, it exhibits various inefficiencies related to data reconstruction. Erasure-coded systems are configured on commodity hardware that is prone to failure. While the storage capacity associated with these devices has been rapidly increasing, the access speed has not kept pace. As such, the time to recover corrupted or lost data has been significantly increasing.

When a storage failure occurs, the data on the failed storage device is reconstructed from the remaining non-faulted storage subsystems/nodes. Data/parity are read from a fixed set of nodes and the failed data is computed. However, quite often one or more of the nodes employed for the reconstruction experiences high read access latency, which extends the time for the reconstruction even further. Additionally, all reconstruction computations are performed on the I/O initiator node. Since reconstruction or recovery of a node occurs relatively frequently this can tax the processor of the input/output ("I/O") initiator node.

In view of these deficiencies in traditional erasure-coding systems, the instant disclosure identifies and addresses a need for systems and methods for selecting a set of storage nodes from a plurality of storage nodes for use in reconstructing data on a faulted node in an erasure-coded system.

SUMMARY

As will be described in greater detail below, the instant disclosure describes various systems and methods for selecting a set of storage nodes from a plurality of storage nodes for use in reconstructing data on a faulted node in an erasure-coded system. The systems and methods may periodically determine an average latency for the storage nodes then select the nodes with the lowest read access latency for use in data reconstruction. In one or more embodiments, the selected nodes may perform coefficient multiplication on their data chunks before transmitting the data chunks to the initiator node for reconstruction.

In one or more examples, a system for selecting a set of storage nodes from a plurality of storage nodes for use in reconstructing data on a faulted node in an erasure-coded system may include several modules stored in memory, including (1) a determination module that determines, over a first period of time, an average read access latency for a first set of storage nodes in the erasure-coded system, (2) a detection module that detects a storage failure on one of the storage nodes, (3) a selection module that selects a subset of the first set of storage nodes, such that the average read access latency for each of the storage nodes within the subset of the first set of storage nodes has a lower average read access latency than at least one other node in the available storage nodes (and possibly all of the remaining nodes), (4) a reconstruction module that reconstructs data that was stored on the failed storage node from the subset of the first set of storage nodes, and (5) at least one physical processor that executes the determination module, the detection module, the selection module, and the reconstruction module.

In one or more embodiments, a method for selecting a set of storage nodes from a plurality of storage nodes for use in reconstructing data on a faulted node in an erasure-coded system may include (1) determining, over a first period of time, an average read access latency for a first set of the storage nodes in the erasure-coded system, (2) detecting a storage failure on one of the storage nodes, (3) selecting a subset of the first set of storage nodes, such that the average read access latency for each of the storage nodes within the subset of the first set of storage nodes has a lower average read access latency than at least one other node in the available storage nodes (and possibly all of the remaining nodes), and (4) reconstructing data that was stored on the failed storage node from the subset of the first set of storage nodes.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) determine, over a first period of time, an average read access latency for a first set of available storage nodes in an erasure-coded system, (2) detect a storage failure on one of the storage nodes, (3) select a subset of the first set of storage nodes, such that the average read access latency for each of the storage nodes within the subset of the first set of storage nodes has a lower average read access latency than at least one other node in the available storage nodes (and possibly all of the remaining nodes), and (4) reconstruct data that was stored on the failed storage node from the subset of the first set of storage nodes.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
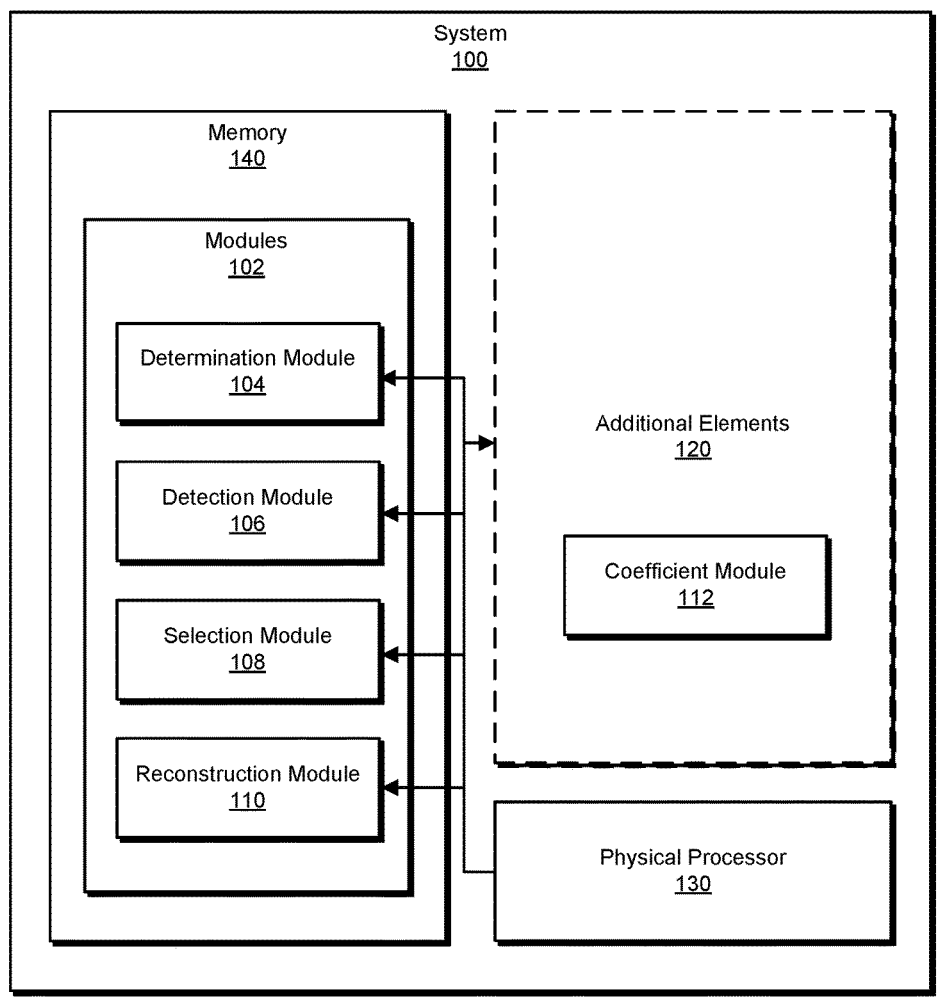
FIG. 1 is a block diagram of an example system for selecting a set of storage nodes from a plurality of storage nodes for use in reconstructing data on a faulted node in an erasure-coded system.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for selecting a set of storage nodes from a plurality of storage nodes for use in reconstructing data on a faulted node in an erasure-coded system. As will be explained in greater detail below, by selecting nodes (data and/or parity) with lower average read access latency for reconstructing a failed data storage device in an erasure-coded system, the various systems and methods described herein may improve the efficiency and performance of redundant array of inexpensive (or independent) disks ("RAID") systems by reducing the data reconstruction time. Moreover, one or more aspects of the systems and methods described herein may improve the functioning and/or performance of the RAID by distributing the processing requirements to multiple devices.

Figure 2:
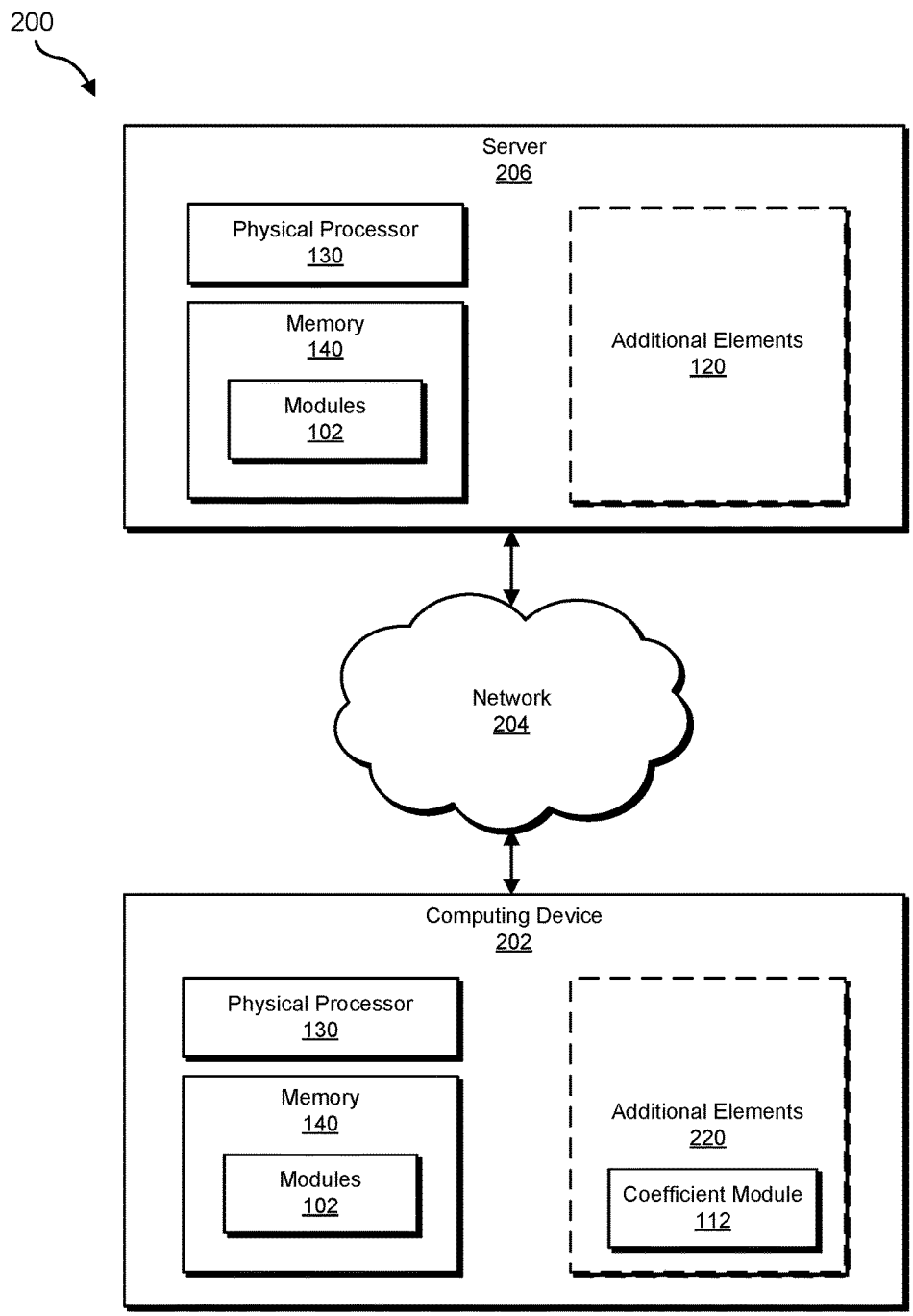
FIG. 2 is a block diagram of an additional example system for selecting a set of storage nodes from a plurality of storage nodes for use in reconstructing data on a faulted node in an erasure-coded system.
Figure 4:
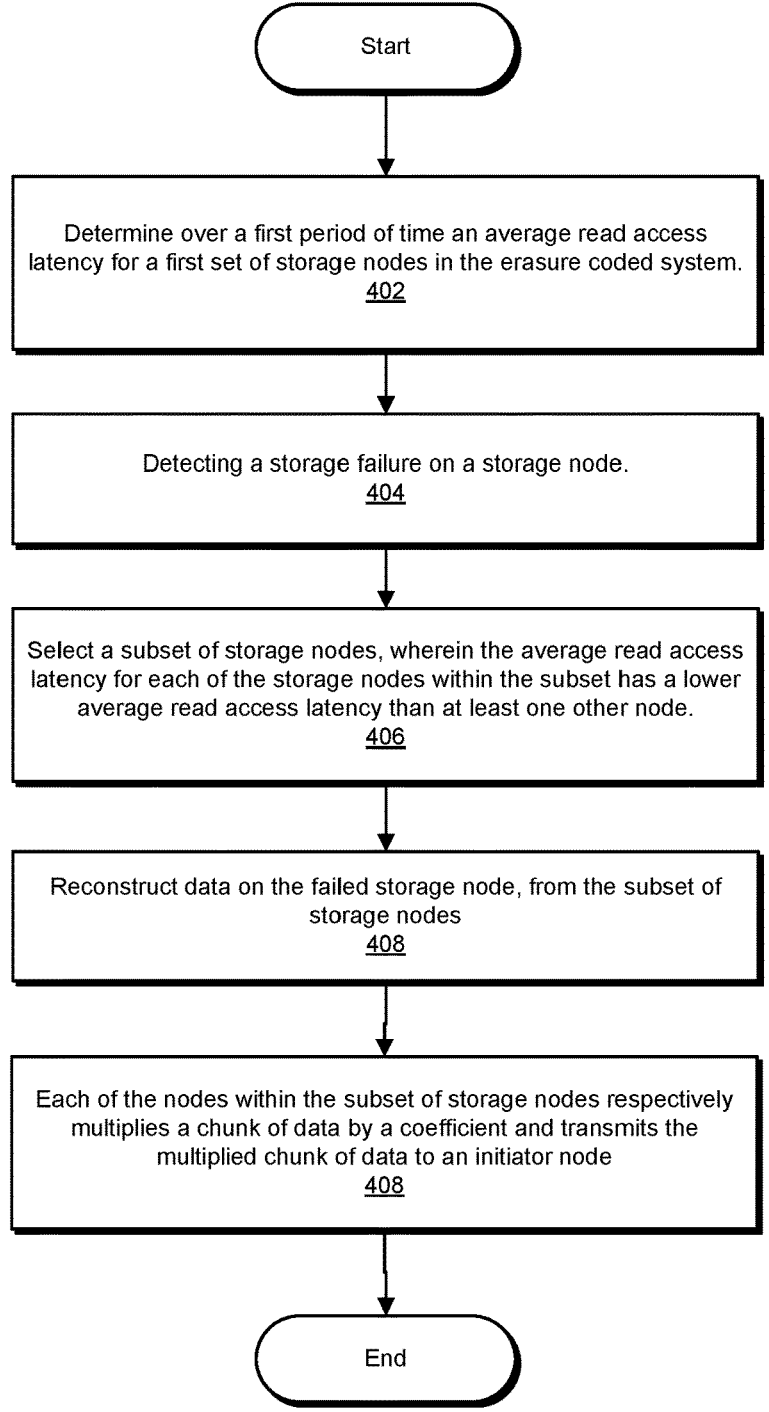
FIG. 4 is a flow diagram of an example method for selecting a set of storage nodes from a plurality of storage nodes for use in reconstructing data on a faulted node in an erasure-coded system.
Figure 5:
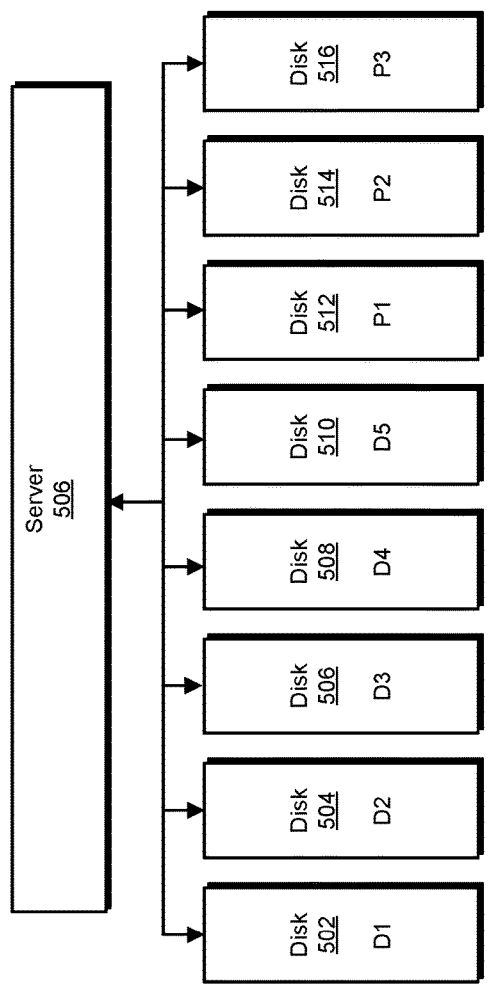
FIG. 5 is a block diagram of another additional example system for selecting a set of storage nodes from a plurality of storage nodes for use in reconstructing data on a faulted node in an erasure-coded system.

The following will provide, with reference to FIGS. 1, 2, and 5, detailed descriptions of example systems for selecting a set of storage nodes from a plurality of storage nodes for use in reconstructing data on a faulted node in an erasure-coded system. Detailed descriptions of corresponding computer-implemented methods will also be provided in connection with FIGS. 3 and 4.

FIG. 1 is a block diagram of an example system 100 for selecting a set of storage nodes from a plurality of storage nodes for use in reconstructing data on a faulted node in an erasure-coded system. As illustrated in this figure, example system 100 may include one or more modules 102 for performing one or more tasks. As also illustrated in this figure, example system 100 may include a physical processor that executes these modules. As will be explained in greater detail below, modules 102 may include a determination module 104 that may periodically determine an average read access latency for a first set of storage nodes, a detection module that may detect a storage failure on one of the storage nodes, a selection module that may select a subset of the first set of storage nodes, such that the average read access latency for each of the storage nodes within the subset of the first set of storage nodes has a lower average read access latency than at least one other node in the available storage nodes (and possibly all of the remaining nodes), and a reconstruction module that may reconstruct data that was stored on the failed storage node from the subset of the first set of storage nodes. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate selecting a set of storage nodes from a plurality of storage nodes for use in reconstructing data on a faulted node in an erasure-coded system. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, or any other suitable physical processor.

As illustrated in FIG. 1, example system 100 may also include one or more additional elements introduced in FIG. 1, such as coefficient module 112 that may multiply a data chunk by a coefficient (such as a Reed-Solomon coefficient or the like) before transmitting the data chunk to a initiator node 206. In one or more examples, coefficient module 112 may include a processor executing instructions to generate a coefficient for a specific data chunk, multiply the data chunk by the coefficient, and then transmit the resulting product for receipt by the initiator node that requested the reconstruction. The processor may be the physical processor 130 or it may be a separate processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to select a set of storage nodes for use in reconstructing data on a faulted node in an erasure coding system. One or more of modules 102 from FIG. 1 may, when executed by at least one processor of computing device 202 and/or server 206, distribute the processing requirements of the reconstruction among the storage nodes that are being used to reconstruct the faulted node.

Computing device 202 generally represents any type or form of computing device capable of reading computer-executable instructions. Examples of computing device 202 include, independent hard drives which make up part of a RAID system. While only a single computing device 202 is illustrated, the technology is not so limited. Those skilled in the art will recognize that multiple computing devices may be employed. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Server 206 (also referred to herein as initiator node) generally represents any type or form of computing device that is capable of distributing data across multiple storage devices (whether the storage devices are directly connected to server 206 or connected via a network), reading data from the various storage devices and reconstructing one or more of the storage devices in the event of a storage device fault. An example of server 206 may include the server portion of a RAID system. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The term "disk," as used herein, generally refers to any medium used to store data. In one or more embodiments, a disk may include a physical disk. Examples of disks include, without limitation, optical disks, magnetic disks, analog disks, and/or any other suitable storage media. In one or more examples, the term disk may be used interchangeably with the term storage device, column or "node" which refers to an independent device which has storage, caching capabilities and hardware and/or software for communicating with the server and capable of interpreting and/or executing computer-readable instructions. A single disk may be deemed multiple storage devices by partitioning the disk into multiple virtual storage devices.

The term "fault" or "fail," as used herein, generally refers to (1) a disk that has stopped working and must be replaced, (2) a disk on which some or all of the data has become corrupted or, (3) a disk on which one or more sectors may have become corrupted or unusable.

The term "encoding," as used herein, generally refers to calculating through the use of a formula.

The term "throughput," as used herein, generally refers to any measurement of information transfer to or from a disk. In one or more embodiments, throughput may refer to the scale of input/output operations the disk is capable of or is handling.

Figure 3:
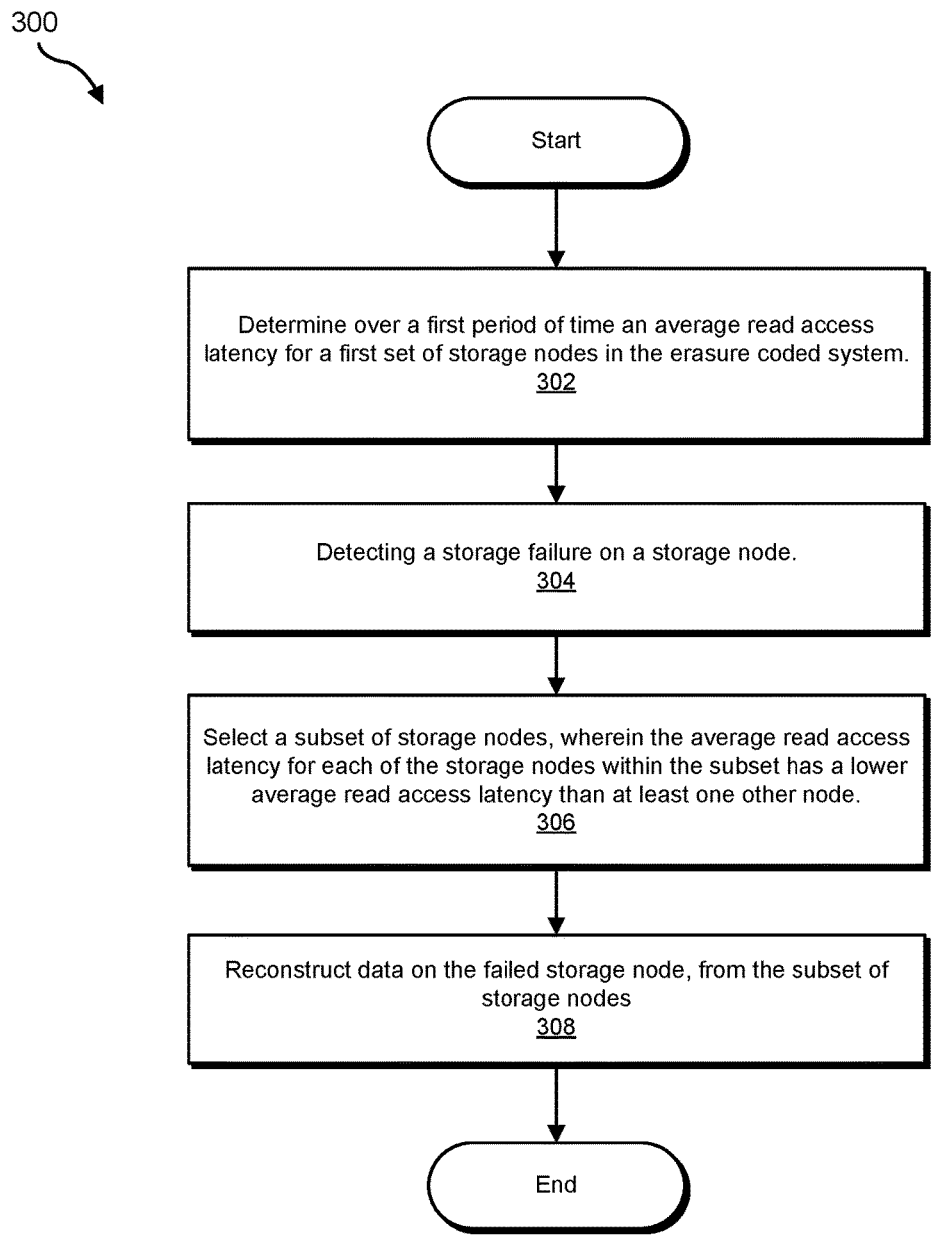
FIG. 3 is a flow diagram of an example method for selecting a set of storage nodes from a plurality of storage nodes for use in reconstructing data on a faulted node in an erasure-coded system.

FIGS. 3 and 4 are flow diagrams of an example computer-implemented method 300 for selecting a set of storage nodes from a plurality of storage nodes for use in reconstructing data on a faulted node in an erasure-coded system. The steps shown in FIGS. 3 and 4 may be performed by any suitable computer-executable code and/or computing system, including system 100 in FIG. 1, system 200 in FIG. 2, and/or variations or combinations of one or more of the same. In one or more examples, each of the steps shown in FIG. 3 may represent an algorithm whose structure includes and/or is represented by multiple sub-steps, examples of which will be provided in greater detail below.

As illustrated in FIG. 3, one or more of the systems described herein may improve speed and throughput using a node selection policy for erasure-coded systems. For example, as illustrated at step 302 determination module 104 may, as part of server 206 in FIG. 2, determine the read access latency for distributed storage subsystems called failure domains (interchangeably referred to as Disk 502-516 in FIG. 5 and computing device 202 in FIG. 2 and storage device). While FIG. 2 illustrates only a single node 202, FIG. 5 illustrates the data D1-D5 being distributed over 5 storage devices 502-516. Those skilled in the art will recognize that there could be fewer than 5 data chunks and fewer than 5 data storage devices or more than 5 data chunks and more than 5 data storage devices and still fall within a scope of one or more of the claims that follow. Additionally, while FIG. 5 illustrates the same number of storage devices 502-510 as there are data chunks and parity chunks, this is done solely for illustration purposes and the system is not so limited.

Determination module 104 may determine storage node read access latency in any suitable manner. For example, determination module 104 may select any or all of the nodes (a set) and compute the average read access latency for each node for time t1 (e.g. for 10 minutes). Time t1 is not limited to 10 minutes and could be longer or shorter. After time t1, determination module 104 may select another set of nodes and compute the average read access latency for each. The sets of nodes may be entirely different or they may include one or more common nodes. Those skilled in the art will recognize that the determination module 104 may compute average read access latency for the various sets of nodes sequentially in time (with or without a gap between computations) and/or in parallel. If done in parallel, the selection of nodes may be done simultaneously or with an offset time that is less than time t1 and still fall within a scope of one or more claims. The determination module 104 may begin computing the latency of nodes before a reconstruction is required (i.e. before a storage failure is detected at step 304 of FIG. 3), but in some embodiments the computation may begin when it is determined that a fault has occurred. Additionally, while determination module 104 may periodically repeat the computation of latency, it is possible to only perform the computation once for each reconstruction or a set number of times and still fall within a scope of one or more claims.

At step 304 of FIG. 3 a storage failure is detected. Storage failure detection module 106 may, as part of server 200 in FIG. 2, detect failures of one or more storage devices. At step 306 of FIG. 3, selection module 108 may, as part of server 200 in FIG. 2, select a subset of the storage nodes, such that the average read access latency for each of the storage nodes within the subset has a lower average read access latency than at least one other node (and possibly all of the remaining nodes). At any point after read access latency for the nodes has been determined selection module 108 may select the k lowest latencies for reconstructing data. Those skilled in the art will recognize that while selection module 108 may select the k lowest latencies, it is possible to select a set of nodes that do not all have the extreme lowest latencies and still fall within a scope of one or more claims. For example, if there are 10 data chunks and 15 nodes, it may be optimal to use nodes 1-10 (1 having the lowest latency) but it is also within a scope of the disclosure to use nodes 2-11 or 1-9 and 12, or some other combination which takes the latency of the various nodes into consideration when making the selection. In a configuration where the determination module 104 periodically determines the read access latency of the nodes, selection module 108 may select an entirely new subset of nodes to use for the next interval of reconstruction, or it may replace one or more nodes in the subset with a node or nodes that have lower read access latency.

Storage failure detection module 106 may detect a storage failure in any suitable manner. For example, most modern day RAID systems rely on the on-disk controllers to signal the RAID controller that they are in distress through Self-Monitoring, Analysis, and Reporting Technology ("SMART") or the like.

Selection module 108 may select the nodes to use for reconstruction in any suitable manner. For example, selection module 108 may read the list of nodes and their respective read access latencies and select the k nodes with the lowest latencies or it may be configured to select a different set of low latency nodes taking other factors into account as well.

At step 308 of FIG. 3 reconstruction module may be the reconstruction of the failed node. Reconstruction module 106 may, as part of server 200 in FIG. 2, reconstruct the data from a faulted storage device utilizing the subset of nodes selected by selection module 108 in step 306 of FIG. 3.

Reconstruction module 110 may select the nodes to use for reconstruction in any suitable manner. For example, during reconstruction, the data/parity read from the subset of nodes is multiplied by specific coefficients and XORed to compute the faulted data. For example, in a system with 6 data nodes and 3 parity nodes. If one node fails, the data of that node can be computed as:

$$\text{Failed data} = x1*a + x2*b + x3*c + x4*d + x5*e + x6*f$$

In this example, "a-f" are data chunks read from the subset of non-faulted nodes, "x1-x6" are the coefficients to be multiplied during reconstruction, "*" is a multiplication function and "+" is an XOR function.

At step 410 of FIG. 4, coefficient module 112 may distribute the processing of the reconstructed data among the subset of nodes. Coefficient module 106 may, as part of server 200 in FIG. 2, instruct the subset of nodes employed for the reconstruction of the failed node to multiply the stored data chunk by a corresponding coefficient prior to sending the resulting product to the initiator node 206. In this way, coefficient module 112 may lessen the processing burden on the initiator node. While the initiator node has been described herein as the server 206, it is within the scope of this disclosure that the initiator node may be a different node other than the server 206. Those skilled in the art will recognize that the initiator node may be configured to instruct fewer than all the subset nodes to multiply the stored data chunk by a corresponding coefficient prior to sending the resulting product to the initiator node 206 and instead reserve some multiplications to the initiator node and still fall within a scope of one or more claims. Additionally, or alternatively, the subset of nodes may be configured to automatically perform the multiplication function without requiring the initiator node to send instructions each time a reconstruction occurs.

As explained above in connection with FIGS. 1-5, the present disclosure is generally directed to systems and methods for selecting a set of storage nodes from a plurality of storage nodes for use in reconstructing data on a faulted node in an erasure-coded system. The systems and methods may take data access latency of the nodes into consideration and select nodes with lower data access latency to decrease the time it takes for reconstruction. These nodes may be selected one time per reconstruction or nodes may be swapped in and out based on a change in the latency of one or more nodes. As a result, the speed of the reconstruction may be increased. Rather than the multiplication of coefficients to data chunks happening at the initiator node (after reading all the required data/parity for each data reconstruction) the multiplication may occur at the storage nodes. Thus, rather than k multiplications being required by the initiator node, which can result in an increase of processor usage and latency of the reconstruction (if multiplication is not happening in parallel on the initiator node) this computation may be distributed among the nodes from which the data/parity is read. Thus, the initiator node may only need to perform XOR after receiving the multiplied data, which may reduce the processor usage and the reconstruction latency While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for selecting a set of storage nodes from a plurality of storage nodes for use in reconstructing data on a faulted node in an erasure-coded system, at least a portion of the method being performed by a computing device comprising at least one processor, the method comprising:
   determining, over a first period of time, an average read access latency for a first set of the plurality of storage nodes in the erasure-coded system;
   detecting a storage failure on one of the plurality of storage nodes;
   selecting a subset of the first set of storage nodes, wherein the average read access latency for each of the storage nodes within the subset of the first set of storage nodes has a lower average read access latency than at least one other node in the plurality of storage nodes; and
   reconstructing data that was stored on the failed storage node, from the subset of the first set of storage nodes.

2. The method according to claim 1, further comprising periodically determining the average read access latency for the first set of the plurality of storage nodes in the system.

3. The method according to claim 2, further comprising:
   detecting another storage failure on another of the plurality of storage nodes;
   replacing at least one of the selected nodes from the subset of the first set of storage nodes with at least another node from the first set of the plurality of storage nodes to create another subset of storage nodes, wherein the at least another node from the first set of the plurality of storage nodes has a lower average read access latency than the at least one of the selected nodes from the subset of the first set of storage nodes that is replaced; and reconstructing data that was stored on the another failed storage node from the another subset of storage nodes.

4. The method according to claim 1, wherein the first set of the plurality of storage nodes in the system comprises all of the plurality of storage nodes in the system.

5. The method according to claim 1:
wherein the first set of the plurality of storage nodes in the system comprises less than all of the plurality of storage nodes in the system;
further comprising determining an average read access latency for a second set of the plurality of storage nodes in the system;
wherein at least one node is not common to both the first set of the plurality of storage nodes and the second set of the plurality of storage nodes.

6. The method according to claim 1, wherein each of the nodes within the subset of the first set of storage nodes has a lower average read access latency than a remainder of the nodes in the plurality of storage nodes.

7. The method according to claim 1, wherein the data includes a plurality of chunks of data and reconstructing the data comprises each of the nodes within the subset of the first set of storage nodes respectively multiplying a chunk of data by a coefficient and transmitting the multiplied chunk of data to an initiator node.

8. The method according to claim 7, wherein the initiator node receives the multiplied chunks of data and reconstructs the data by applying an exclusive OR function to the received multiplied chunks of data.

9. A system for selecting a set of storage nodes from a plurality of storage nodes for use in reconstructing data on a faulted node in an erasure-coded system, the system comprising:
a determination module, stored in memory, that determines, over a first period of time, an average read access latency for a first set of the plurality of storage nodes in the erasure-coded system;
a detection module, stored in memory, that detects a storage failure on one of the plurality of storage nodes;
a selection module, stored in memory, that selects a subset of the first set of storage nodes, wherein the average read access latency for each of the storage nodes within the subset of the first set of storage nodes has a lower average read access latency than at least one other node in the plurality of storage nodes; and
a reconstruction module, stored in memory, that reconstructs, data that was stored on the failed storage node, from the subset of the first set of storage nodes; and
at least one physical processor that executes the determination module, the detection module, the selection module, and the reconstruction module.

10. The system according to claim 9, wherein the determination module periodically determines the average read access latency for the first set of the plurality of storage nodes in the system.

11. The system according to claim 10, wherein:
the detection module further detects another storage failure on another of the plurality of storage nodes;
the selection module replaces at least one of the selected nodes from the subset of the first set of storage nodes with at least another node from the first set of the plurality of storage nodes to create another subset of storage nodes, wherein the at least another node from the first set of the plurality of storage nodes has a lower average read access latency than the at least one of the selected nodes from the subset of the first set of storage nodes that is replaced; and
the reconstruction module reconstructs data that was stored on the another failed storage node from the another subset of storage nodes.

12. The system according to claim 10, wherein the first set of the plurality of storage nodes in the system comprises less than all of the plurality of storage nodes in the system;
the determination module determining an average read access latency for a second set of the plurality of storage nodes in the system; and
at least one node is not common to both the first set of the plurality of storage nodes and the second set of the plurality of storage nodes.

13. The system according to claim 10, wherein each of the nodes within the subset of the first set of storage nodes has a lower average read access latency than a remainder of the nodes in the plurality of storage nodes.

14. The system according to claim 10, wherein:
the data includes a plurality of chunks of data;
the reconstruction module causes each of the nodes within the subset of the first set of storage nodes respectively to multiply a chunk of data by a coefficient and transmit the multiplied chunk of data to an initiator node.

15. The system according to claim 14, wherein the reconstruction module causes the initiator node to reconstructs the data by applying an exclusive OR function to the multiplied chunks of data.

16. A non-transitory computer-readable medium comprising one or more computer-executable instructions that, when executed by at least one processor of a computing device, cause the computing device to:
determine, over a first period of time, an average read access latency for a first set of a plurality of storage nodes in an erasure-coded system;
detect a storage failure on one of the plurality of storage nodes;
select a subset of the first set of storage nodes, wherein the average read access latency for each of the storage nodes within the subset of the first set of storage nodes has a lower average read access latency than at least one other node in the plurality of storage nodes; and
reconstruct data that was stored on the failed storage node, from the subset of the first set of storage nodes.

17. The non-transitory computer-readable medium according to claim 16, wherein the one or more computer-executable instructions cause the computing device to periodically determining the average read access latency for the first set of the plurality of storage nodes.

18. The non-transitory computer-readable medium according to claim 17, wherein the one or more computer-executable instructions cause the computing device to:
detect another storage failure on another of the plurality of storage nodes;
replace at least one of the selected nodes from the subset of the first set of storage nodes with at least another node from the first set of the plurality of storage nodes to create another subset of storage nodes, wherein the at least another node from the first set of the plurality of storage nodes has a lower average read access latency than the at least one of the selected nodes from the subset of the first set of storage nodes that is replaced; and
reconstruct data that was stored on the another failed storage node, from the another subset of storage nodes.

19. The non-transitory computer-readable medium according to claim 17, wherein:

the first set of the plurality of storage nodes comprises less than all of the plurality of storage nodes;

the one or more computer-executable instructions cause the computing device to determine an average read access latency for a second set of the plurality of storage nodes; and at least one node is not common to both the first set of the plurality of storage nodes and the second set of the plurality of storage nodes.

20. The non-transitory computer-readable medium according to claim 17, wherein the data includes a plurality of chunks of data and wherein the one or more computer-executable instructions cause the computing device to cause each of the nodes within the subset of the first set of storage nodes respectively to multiply a chunk of data by a coefficient and transmit the multiplied chunk of data to an initiator node.

* * * * *